(12) United States Patent
Goldin et al.

(10) Patent No.: US 11,855,800 B1
(45) Date of Patent: Dec. 26, 2023

(54) ONE-LINE SYNCHRONOUS INTERFACE

(71) Applicant: Renesas Electronics America Inc., Milpitas, CA (US)

(72) Inventors: Leonid Goldin, Ottawa (CA); Greg Anton Armstrong, Ottawa (CA)

(73) Assignee: Renesas Electronics America Inc., Milpitas, CA (US)

( * ) Notice: Subject to any disclaimer, the term of this patent is extended or adjusted under 35 U.S.C. 154(b) by 0 days.

(21) Appl. No.: 17/902,139

(22) Filed: Sep. 2, 2022

(51) Int. Cl.
| | |
|---|---|
| *H04B 1/69* | (2011.01) |
| *H04B 1/707* | (2011.01) |
| *H04B 1/713* | (2011.01) |
| *H04L 12/40* | (2006.01) |
| *H04L 7/06* | (2006.01) |

(52) U.S. Cl.
CPC .......... *H04L 12/40013* (2013.01); *H04L 7/06* (2013.01)

(58) Field of Classification Search
CPC ... H04L 12/40013; H04L 7/06; H04L 5/1484; H04M 9/025; H04Q 11/0407; H04Q 11/0067; H04H 60/97; H04W 92/02; H04J 3/0667; H04J 3/0688; G06F 1/10
USPC .................................. 375/138, 257, 357, 354
See application file for complete search history.

(56) References Cited

U.S. PATENT DOCUMENTS

| | | | | |
|---|---|---|---|---|
| 4,791,629 | A  * | 12/1988 | Burns ................ | H04Q 11/0407 370/363 |
| 5,040,172 | A  * | 8/1991 | Mano .................... | H04L 5/1484 370/431 |
| 6,381,239 | B1 * | 4/2002 | Atkinson .............. | H04M 9/025 370/362 |
| 7,027,461 | B1 * | 4/2006 | Bontempi ............. | H04H 60/97 370/461 |
| 10,075,284 | B1 * | 9/2018 | Rodrigues ............ | H04J 3/0688 |
| 11,561,572 | B2 * | 1/2023 | Goldin ...................... | G06F 1/10 |
| 2009/0180460 | A1* | 7/2009 | Chang .................. | H04W 92/02 370/345 |
| 2009/0238559 | A1* | 9/2009 | Pfeiffer .............. | H04Q 11/0067 398/58 |
| 2019/0379475 | A1* | 12/2019 | Seethamraju ......... | H04J 3/0667 |

* cited by examiner

*Primary Examiner* — Phuong Phu
(74) *Attorney, Agent, or Firm* — SCULLY, SCOTT, MURPHY & PRESSER, P.C.

(57) ABSTRACT

Methods and system for one-line synchronous interface are described. A timing device including a first buffer can be connected to a line card including a second buffer. The timing device can control the first buffer to output a synchronization pulse to the line card periodically at a time interval. For each output of the synchronization pulse, the timing device can switch the first buffer from a first output mode to a first input mode. Under the first input mode, the timing device listen for incoming data on the trace. The line card can receive the synchronization pulse periodically at the time interval. For each receipt of the synchronization pulse, the line card can switch the second buffer from a second input mode to a second output mode. Under the second output mode, the line card can transmit outgoing data on the trace.

20 Claims, 4 Drawing Sheets

ONE-LINE SYNCHRONOUS INTERFACE

BACKGROUND

The present disclosure relates in general to devices and systems that provide a synchronous serial interface over a single signal wire (e.g., a one-line synchronous interface), where data can be exchanged between a master device and a slave device while carrying synchronization from the master device to the slave device.

A communication equipment (e.g., a network element) can include a plurality of line cards (e.g., slave devices) and a clock source (e.g., master device) that can provide clock signals to the plurality of line cards. A timing card can operate as a master device that distributes the clock signals to the plurality of line cards. The clock signals can be distributed via a backplane having a plurality of traces, where the plurality of traces can vary in size.

SUMMARY

In one embodiment, an apparatus for a one-line synchronous interface is generally described. The apparatus can include a buffer configured to operate in an output mode to output signals to a trace, and operate in an input mode to receive signals from the trace. The apparatus can further include a controller connected to the buffer. The controller can be configured to control the buffer to output a synchronization pulse to the trace periodically at a time interval. The controller can be further configured to, in response to each output of the synchronization pulse, switch the buffer from the output mode to the input mode. The controller can be further configured to, in response to the switch of the buffer from the output mode to the input mode, listen for incoming data on the trace. The controller can be further configured to, in response to the buffer operating the input mode for a predetermined time, switch the buffer from the input mode to the output mode, where the predetermined time can be less than the time interval.

In one embodiment, an apparatus for a one-line synchronous interface is generally described. The apparatus can include a buffer configured to operate in an output mode to output signals to a trace, and operate in an input mode to receive signals from the trace. The apparatus can further include a controller connected to the buffer. The controller can be configured to, in response to a receipt of a synchronization pulse from the trace at the buffer, switch the buffer from the input mode to the output mode, where the buffer can receive the synchronization pulse periodically at a time interval. The controller can be further configured to, in response to the switch of the buffer from the input mode to the output mode, transmit outgoing data on the trace. The controller can be further configured to, in response to the buffer operating the input mode for a predetermined time, switch the buffer from the output mode to the input mode, wherein the predetermined time is less than the time interval.

In one embodiment, a system for one-line synchronous interface is generally described. The system can include a timing device and a line card configured to be in communication with the timing device via a trace of a backplane. The timing device can include a first buffer. The line card can include a second buffer. The timing device can be configured to control the first buffer to output a synchronization pulse to the trace periodically at a time interval. The timing device can be further configured to, in response to each output of the synchronization pulse, switch the first buffer from a first output mode to a first input mode. The first output mode can allow the timing device to transmit signals to the line card, and the first input mode can allow the timing device to receive signals from the line card. In response to the switch of the first buffer from the first output mode to the first input mode, the timing device can listen for incoming data on the trace. In response to the buffer operating the input mode for a predetermined time, the timing device can switch the first buffer from the first input mode to the first output mode, where the predetermined time can be less than the time interval. The line card can be configured to, in response to a receipt of the synchronization pulse from the trace at the second buffer, switch the second buffer from a second input mode to a second output mode. The second buffer can receive the synchronization pulse periodically at the time interval. The second output mode can allow the line card to transmit signals to the timing device, and the second input mode can allow the line card to receive signals from the timing device. The line card can be configured to, in response to the switch of the second buffer from the second input mode to the second output mode, transmit outgoing data on the trace. The line card can be configured to, in response to the second buffer operating the output mode for the predetermined time, switch the second buffer from the second output mode to the second input mode.

The foregoing summary is illustrative only and is not intended to be in any way limiting. In addition to the illustrative aspects, embodiments, and features described above, further aspects, embodiments, and features will become apparent by reference to the drawings and the following detailed description. In the drawings, like reference numbers indicate identical or functionally similar elements.

DETAILED DESCRIPTION

In the following description, numerous specific details are set forth, such as particular structures, components, materials, dimensions, processing steps and techniques, in order to provide an understanding of the various embodiments of the present application. However, it will be appreciated by one of ordinary skill in the art that the various embodiments of the present application may be practiced without these specific details. In other instances, well-known structures or processing steps have not been described in detail in order to avoid obscuring the present application.

A communication equipment can include a plurality of line cards and a timing device configured to distribute clock signals to the plurality of line cards. The clock signals can be distributed through a backplane coupled between the timing device and the plurality of line cards. The timing device can operate as a master clock device and distribute the clock signals to the line cards operating as slave devices. The distributed clock signals can be phase aligned across the plurality of line cards such that the plurality of line cards can be synchronized to the clock signal. A communication system may require communication equipment to have precise phase alignment across the line cards receiving the distributed clock signals. The varying size of traces in the backplane, and operating conditions (e.g., environment, temperature, etc.) of the communication equipment, can contribute to different amount of delays across the line cards. In some examples, techniques such as static propagation delay compensation can be used to align the clocks across the line cards, but may be unable to compensate effects caused by operating conditions such as temperature variation on different transmission lines or traces.

Figure 1:
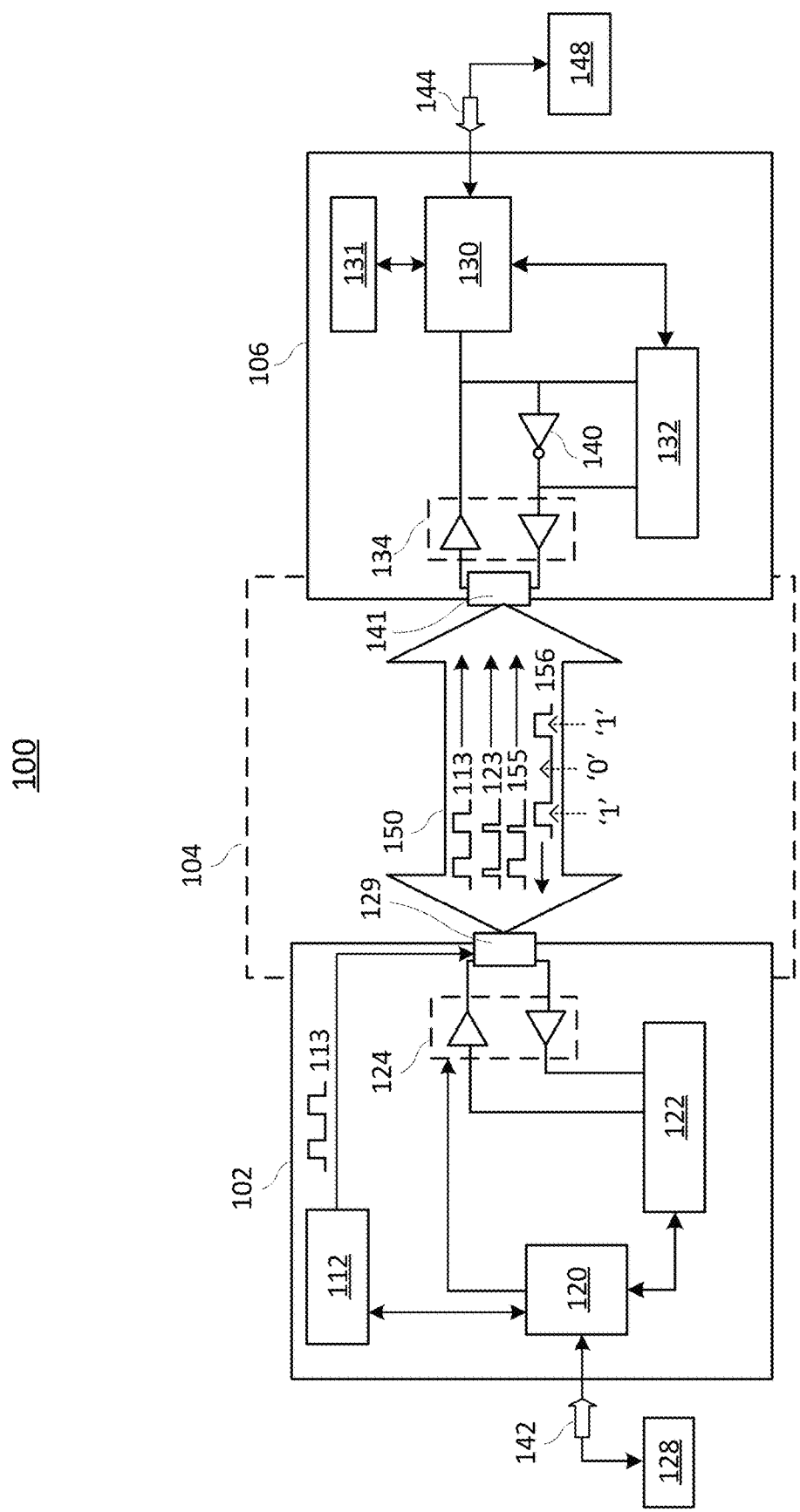
FIG. 1 illustrates an example system for implementing one-line synchronous interface in one embodiment.

FIG. 1 illustrates an example system for implementing one-line synchronous interface in one embodiment. System 100 can be implemented in a communication equipment, such as a network element. Examples of network elements can include, but not limited to, routers, servers, hubs, switches, access points, etc. The system 100 can include a timing device (or timing card) 102, a backplane 104, and a plurality of line cards including a line card 106. In one embodiment, timing device 102 can receive a physical clock signal, that references a known time, from a clock source that may be separated from timing device 102. Timing device 102 can include a clock generator 112 configured to generate a clock signal 113 based on the physical clock signal. In one embodiment, clock generator 112 can be a pulse width modulation (PWM) signal generator and clock signal 113 can be PWM signals. Clock signal 113 can include a plurality of clock pulses having the same or uniform pulse width and separated by a time interval. The time interval can be equivalent to a clock cycle duration of system 100. Timing device 102 can operate as a master device that distributes clock signal 113 to a plurality of slave devices, such as a plurality of line cards including line card 106. The plurality of line cards can use clock signal 113 to synchronize its own internal clock and/or can regenerate clock signal 113. Backplane 104 can include a plurality of traces, and the clock signal 113 can be transmitted from timing device 102 to the plurality of line cards via the plurality of traces. Backplane 104 can include unidirectional or bi-directional traces.

Timing device 102 can further include a controller 120, a logic circuit 122, and a buffer 124. Controller 120 can be a microcontroller or other types of hardware processing element. Controller 120 can be integrated into the timing device 102, or can be electrically coupled to timing device 102. Controller 120 can be electrically coupled to logic circuit 122. Logic circuit 122 can be a time-to-digital converter (TDC) configured to detect a signal event (e.g., rising or falling edge of signals) at buffer 124 and convert the detected signal event to a digital representation indicating a time in which the detected signal event occurred. In one embodiment, logic circuit 122 can measure a time interval between arrival times of two signals and convert the time interval into a digital representation indicating the time interval.

Buffer 124 can be coupled between controller 120 and a port 129 (e.g., an input/output port) of timing device 102. Port 129 can connect buffer 124 to a trace 150 among backplane 104. Trace 150 can connect timing device 102 to a plurality of line cards, including line card 106. Controller 120 can be configured to control buffer 124 to switch between an input mode and an output mode. The input mode of buffer 124 can allow timing device 102 to receive signals from line card 106 via buffer 124, and the output mode of buffer 124 can allow timing device 102 to output signals to line card 106 via buffer 124. Further, under the input mode of buffer 124, signals can be received at buffer 124 from trace 150. Under the output mode of buffer 124, buffer 124 can place outgoing signals onto trace 150. In one embodiment, controller 120 can switch buffer 124 between the input and output modes in order for incoming signals and outgoing signals to use the same trace 150. In one embodiment, controller 120 can implement time division multiplexing (TDM) schemes to control switching buffer 124 between input and output modes. In one embodiment, under the output mode, buffer 124 can output clock signal 113 to the plurality of line cards, including line card 106, in order to synchronize the plurality of line cards using clock signal 113.

Line card 106 can include a controller 130, a logic circuit 132, a buffer 134, and an inverter 140. Controller 130 can be a microcontroller or other types of hardware processing element. Controller 130 can be integrated into line card 106, or can be electrically coupled to line card 106. Controller 130 can be electrically coupled to logic circuit 132. Logic circuit 132 can be a time-to-digital converter (TDC) configured to detect a signal event (e.g., rising or falling edge of signals) at buffer 134 and convert the detected signal event to a digital representation indicating a time in which the detected signal event occurred. Inverter 140 can be configured to invert a signal being received at line card 106 in order to return the received signal back to the sender (e.g., timing device 102).

Buffer 134 can be coupled between controller 130 and a port 141 (e.g., input/output port) of the line card 106. Port 141 can connect buffer 134 to trace 150 among backplane 104. Controller 130 can be configured to control buffer 134 to switch between an input mode and an output mode. The input mode of buffer 134 can allow line card 106 to receive signals from timing device 102 via buffer 134, and the output mode of buffer 134 can allow line card 106 to output signals to timing device via buffer 134. Under the input mode of buffer 134, signals can be received at buffer 134 from trace 150. Under the output mode of buffer 134, buffer 134 can place outgoing signals onto trace 150. In one embodiment, controller 130 can switch buffer 134 between the input and output modes in order for incoming signals and outgoing signals to use the same trace 150. In one embodiment, controller 130 can implement time division multiplexing (TDM) schemes to control switching buffer 134 between input and output modes. In one embodiment, under the input mode, buffer 134 can receive clock signal 113 from timing device 102 and synchronize its internal clock using clock signal 113.

The utilization of buffers 124, 134 to switch between input and output modes of timing device 102 and line card 106 allows data to be exchanged between timing device 102 and line card 106 using the same trace 150, and clock signals for synchronization can also be distributed to line cards using the same trace 150. The usage of the same trace to transmit clock signals for synchronization and exchange data allows system 100 to provide a synchronous serial interface over a single signal wire. Read and write transactions can be performed between timing device 102 and line card 106 while carrying synchronization signals from timing device 102 to line card 106.

In one embodiment, timing device 102 can write data to line card 106 by transmitting PWM signals on trace 150. Timing device 102 can transmit a first PWM signal (e.g., a pulse) having a first pulse width representing a first binary value (e.g., binary '1') to line card 106 via trace 150. Timing device can transmit a second PWM signal having a second pulse width representing a second binary value (e.g., binary '0') to line card 106 via trace 150. The second pulse width can be less than the first pulse width.

In one embodiment, timing device 102 can transmit a third PWM signal having a third pulse width to line card 106 via trace 150. The third pulse width can be less than the first pulse width and the second pulse width. In response to line card 106 receiving the third PWM signal, a round trip time (RTT) measurement can be performed between timing device 102 and line card 106. The RTT measurement can be performed by having line card 106 respond to the third PWM signal with RTT pulses that can be used by timing device 102 to determine RTT between timing device 102 and line card 106.

In one embodiment, to initiate a read request, timing device 102 can transmit a read request signal 155 to line card 106. Read request signal 155 can include one or more PWM signals (e.g., one or more pulses) and each PWM signal among read request signal 155 can have a respective predetermined pulse width. In one embodiment, a device 128 can send a read request 142 to timing device 102. Read request 142 can indicate a request to read data from line card 106, a storage location (e.g., address) of the requested data, and/or a size (e.g., number of bits of bytes) of the requested data. In response to timing device receiving read request 142, controller 120 can encode the request to read data from line card 106, an identifier of line card 106, the storage location of the requested data, and/or the size of the requested data, in read request signal 155.

Timing device 102 can send read request signal 155 to line card 106, via trace 150, when buffer 124 is operating under the output mode. In one embodiment, controller 120 can determine whether buffer 124 is currently operating under input mode or output mode. If buffer 124 is operating input mode, controller 120 can determine an appropriate time to switch buffer 124 to output mode. For example, if there is an ongoing read request being processed (e.g., timing device 102 is not done reading from line card 106), controller 120 can wait until the ongoing read request is complete before switching buffer 124 to output mode for sending read request signal 155.

In response to buffer 124 outputting read request signal 155, controller 120 can control buffer 124 to output a synchronization signal 123 to line card 106. Synchronization signal 123 can be a PWM signal including a plurality of pulses having a uniform pulse width (e.g., same pulse width). The pulses among synchronization signal 123 can be outputted by buffer 124 at a predetermined time interval. In one embodiment, the predetermined time interval can be equivalent to a clock cycle of system 100 (e.g., period of clock signal 113) such that line card 106 can use synchronization signal 123 for synchronization. In one embodiment, controller 120 can notify clock generator 112 to generate synchronization signal 123 by pulling down clock signal 113 at a specific time of the clock cycle of clock signal 113 to reduce a pulse width of clock signal 113 to the pulse width of synchronization signal 123. In one embodiment, a resistor can be connected to port 141 of line card 106 to speed up a discharge of trace 150.

A number of pulses among synchronization signal 123 can be based on the size of the requested data. In one embodiment, the number of pulses among synchronization signal 123 can be equivalent to a number of bits of the requested data. For example, if the requested data is a 2-byte (e.g., 16 bits) word, then synchronization signal 123 can include 16 pulses. Hence, a request for N-bit data can cause synchronization signal 123 to include N pulses. To control the number of pulses being outputted by buffer 124, controller 120 can switch buffer 124 between input mode and output mode for a number of times equivalent to the size (e.g., number of bits) of the requested data. In one embodiment, in response to buffer 124 outputting read request signal 155, for N bits of requested data, controller 120 can schedule switching buffer 124 between input mode and output mode N times, resulting in buffer 124 outputting N pulses as synchronization signal 123.

In response to buffer 124 outputting a first pulse among synchronization signal 123, controller 120 can switch buffer 124 from output mode to input mode in order for timing device 102 to receive a response from line card 106. After a lapse of the predetermined time interval between pulses of synchronization signal (or the period of clock signal 113), controller 120 can switch buffer 124 from input mode to output mode. In response to the switch to output mode, buffer 124 can output a second pulse among synchronization signal 123. In response buffer 124 outputting the second pulse among synchronization signal 123, controller 120 can switch buffer 124 from output mode to input mode. The switch between input mode and output mode can occur for each instance where buffer 124 output a pulse among synchronization signal 123. Hence, controller 120 can switch buffer 124 between input mode and output mode N times for a request for N bits of data.

When buffer 134 is operating under input mode, line card 106 can receive read request signal 155. Controller 130 can decode the request to read data from line card 106, the identifier of line card 106, the storage location of the requested data, and/or the size of the requested data, from read request signal 155. Line card 106 can send the requested data to timing device 102. In order to send the requested data to timing device 102 while maintaining synchronization, controller 130 can switch buffer 134 between input mode and output mode in order to receive synchronization signal 123 and outputting the requested data in between consecutive pulses of synchronization signal 123.

In one embodiment, in response to buffer 134 receiving the first pulse among synchronization signal 123, controller 130 can switch buffer 134 from input mode to output mode in order for line card 106 to provide a first bit of the requested data to timing device 102. In response to providing the first bit of the requested data, and/or after a lapse of the predetermined time interval between pulses of synchronization signal (or the period of clock signal 113), controller 130 can switch buffer 134 from output mode to input mode. In response to the switch to input mode, buffer 134 can receive the second pulse among synchronization signal 123. In response buffer 134 receiving the second pulse among synchronization signal 123, controller 130 can switch buffer 134 from input mode to output mode. The switch between input mode and output mode can occur for each instance where buffer 134 receives a pulse among synchronization signal 123. Hence, controller 130 can switch buffer 134 between input mode and output mode N times for a request for N bits of data.

In one embodiment, line card 106 can provide a single bit of data to timing device by either sending a pulse, or by not sending a pulse, between consecutive pulses of synchronization signal 123. A pulse being sent by line card 106 between consecutive pulses of synchronization signal 123 can represent a first binary value, such as binary '1', of the requested data. No pulse being sent by line card 106 between consecutive pulses of synchronization signal 123 can represent a second binary value, such as binary '0', of the requested data. In FIG. 1, a signal 156 being sent from line card 106 to timing device 102 can represent the bits '101' of the requested data. The representations of the first and second binary values can be arbitrary, such as a presence of a pulse between consecutive pulses of synchronization signal 123 can represent binary '0' and no pulse between consecutive pulses of synchronization signal 123 can represent binary '1'. In one embodiment, line card 106 send round trip time (RTT) pulses between consecutive pulses of synchronization signal 123 to represent the first binary value (e.g., binary '1'). The representation can be based on a design of the hardware components and/or desired implementation of system 100.

In one embodiment, in response to buffer 134 receiving read request signal 155, controller 130 can retrieve the requested data from a device 148 storing the requested data. Controller 130 can latch the requested data in storage elements, such as a set of latches 131. Line card 106 can provide the requested data latched in latches 131 to timing device 102. The latching of the requested data can ensure that line card 106 is providing a correct version of the requested data. For example, the requested data can change after line card 106 receives read request data 155. Since line card 106 provides the requested data serially (e.g., one bit at a time), there is a risk of the requested data being changed when the transmission of the requested data is not complete. Hence, the latching can allow line card 106 to transmit correct version of the requested data.

Therefore, timing device 102 can send write data to line card 106 using PWM signals and read function can be achieved by having line card 106 either responding to, or not responding to, timing device 102 between pulses of synchronization signal 123. The switching between input mode and output mode of buffers 124, 134 can allow line card 106 to receive synchronization signal 123 to perform synchronization while providing the requested data to timing device 102. Further, the switching between input mode and output mode of buffers 124, 134 can allow timing device 102 and line card 106 to exchange data at relatively high speeds (e.g., megahertz scale) while maintaining synchronization at line card 106.

Figure 2:
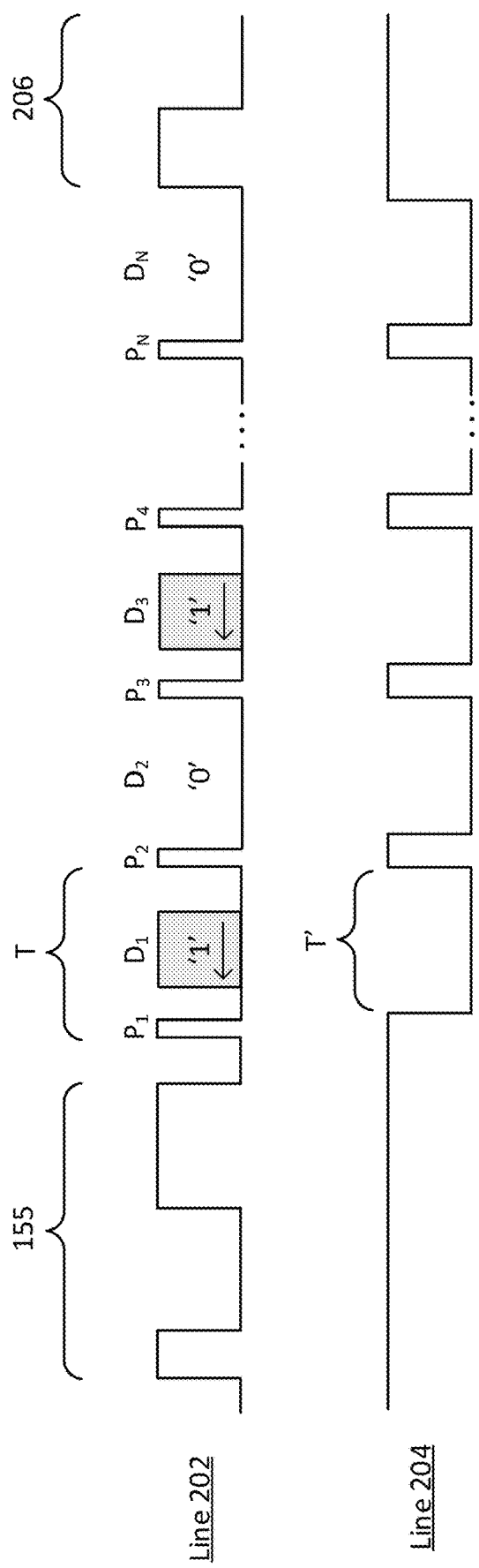
FIG. 2 illustrates a timing diagram relating to one-line synchronous interface in one embodiment.

FIG. 2 illustrates waveforms on signal lines relating to one-line synchronous interface in one embodiment. The description of FIG. 2 can reference components of FIG. 1. A signal line 204 can be a signal line connecting controller 120 to buffer 124. Line 204 can be used for an enable signal for enabling or disabling the output mode of buffer 124. In one embodiment, when the enable signal on line 204 is HIGH, the output mode of buffer 124 is enabled and when the enable signal on line 204 is LOW, the output mode of buffer 124 is disabled. Controller 120 can be configured to drive the enable signal on line 204 to enable or disable the output mode of buffer 124.

A signal line 202, which can be trace 150, during the output mode of buffer 124 is also shown in FIG. 2. In one embodiment, buffer 124 can output read request signal 155 on line 202 (or trace 150) when enable signal on line 204 is HIGH. In response to buffer 124 outputting read request signal 155, controller 120 can control buffer 124 to begin outputting synchronization signal 123 to line card 106. If N bits of data (e.g., $D_1, D_2, \ldots, D_N$) is being requested, then controller 120 can control buffer 124 to output N synchronization pulses $P_1, P_2, \ldots, P_N$. As shown in FIG. 2, a synchronization pulse $P_1$ can be outputted on line 202 after read request signal 155. In response to outputting synchronization pulse $P_1$, controller 120 can switch buffer 124 to its input mode (e.g., disable output mode) by pulling the enable signal on line 204 to LOW. In response to switching buffer 124 to input mode, controller 120 can listen for incoming signals on line 202.

Buffer 134 of line card 106, when operating under input mode, can receive read request signal 155 from line 202 (or trace 150). Subsequently, buffer 134 can receive synchronization pulse $P_1$. In response to receiving synchronization pulse $P_1$, controller 130 of line card 106 can switch buffer 134 from its input mode to its output mode to begin providing the requested data to timing device 102. Note that when buffer 124 is operating under input mode, buffer 134 can be operating in output mode, and vice versa. As shown in FIG. 2, in response to receiving synchronization pulse $P_1$, buffer 134 can send one bit of data $D_1$ to buffer 124 on line 202. Since controller 120 is listening for incoming signals on line 202 when buffer 124 is operating in input mode, controller 120 can receive data $D_1$ via buffer 124.

In response to a lapse of time T', controller 120 can switch buffer 124 from input mode to output mode. Also, in response to a lapse of time T', controller 130 can switch buffer 134 from output mode to input mode. Time T' can be a predetermined time less than a time interval T, where T can be a period or time interval between consecutive synchronization pulses among $P_1, P_2, \ldots P_N$. As shown in FIG. 2, in response to a lapse of time T', controller 120 can pull up the enable signal on line 204 to enable the output mode of buffer 124 in order for buffer 124 to output a next synchronization pulse $P_2$ on line 202.

Buffer 134 can receive synchronization pulse $P_2$ and, in response, controller 130 can switch buffer 134 from its input mode to its output mode to provide a next bit of the requested data to timing device 102. If the next bit of the requested data is binary '0', then in response to receiving synchronization pulse $P_2$, buffer 134 does not output any pulse on line 202.

After every instance of disabling the output mode of buffer 124 (e.g., every time the enable signal on line 204 is pulled down to LOW), in response to a lapse of time T', controller 120 of timing device 102 can switch buffer 124 from input mode to output mode. After every instance of disabling the input mode of buffer 134, in response to a lapse of time T', controller 130 of line card 106 can switch buffer 134 from output mode to input mode. If N bits of data is requested, controller 120 and controller 130 can perform the input/output mode switch N times. Further, the pulse width of synchronization pulses $P_1, P_2, \ldots, P_N$ can be predefined to a width that provides ample time for line card 106 to return pulse representing, for example, binary '1'.

In one embodiment, in response to buffer 134 receiving read request signal 155, controller 130 can retrieve the requested data from device 148 storing the requested data. Controller 130 can latch the requested data in storage elements, such as latches 131, and the data bits $D_1, D_2, \ldots, D_N$ can be latched. In one embodiment, line card 106 can begin to provide the requested data in response to receiving a synchronization pulse different from the first synchronization pulse $P_1$. For example, if a time needed to perform the latching is less than time T and greater than a pulse width of synchronization pulse $P_1$ (e.g., greater than (T−T')), then line card 106 may begin to send the requested data to timing device 102 in response to receiving $P_2$. In other words, line card 106 can be programmed to wait for T, after receiving read request signal 155, to begin sending the requested data. Further, timing device 102 can also be programmed to interpret any data received from line card 106 after $P_1$, and before $P_2$, may not be the requested data. The amount of time for line card 106 to wait to send the requested data can be arbitrary and can be dependent on a desired implementation of system 100, such as T, 2T, or the like.

In one embodiment, when line card 106 are programmed to wait for a predetermined amount of time before sending the requested data, line card 106 can utilize the line 202 for performing other functions during the wait. For example, as line card 106 is latching the requested data, buffer 134 can be operating under the output mode and line 202 may not be in use (e.g., during the time between synchronization pulses $P_1$, $P_2$). During this time where line 202 is not in use, line card 106 can perform actions such as sending RTT pulses to perform RTT calculations with timing device 102. Timing device 102 can also be programmed to wait for a predetermined amount of time before receiving the requested data, and can be program to interpret the data being received during the wait time may not the requested data and may be other data such as RTT pulses.

In one embodiment, in response to a lapse of time T' after sending the N-th synchronization pulse $P_N$, controller 120 can switch buffer 124 from input mode to output mode and send a stop signal 206. Stop signal 206 can include one or more pulses encoding a stop message to notify line card 106 that the requested data has been received and the read request can be stopped. Line card 106 can receive stop signal 206 when buffer 134 is operating under input mode. In response to receive stop signal 206, line card 106 can decode the stop message and stop responding to the read request and resume normal operations.

In one embodiment, other line cards connected to timing device 102 can also see line 202. Synchronization signal 123 including $P_1$, $P_2$, ..., $P_N$ can be distributed to other line cards, that did not make a read request, via line 202 as well. Since synchronization signal 123 has the same clock cycle as clock signal 113, those other line cards can use synchronization signal 123 as clock signal 113 for synchronizing their own clock. Further, read request signal 155 can encode the identifier of line card 106 (e.g., the line card 106 that can access the requested data). Lines cards that are different from line card 106 can receiver the read request signal 155 but may not respond to the read request. Therefore, even though a plurality of line cards can see the same line 202, the line card identified by the read request can respond to the read request while performing synchronization using the synchronization signal 123, and other line cards can continue their normal operation while performing synchronization using the synchronization signal 123 as well.

Figure 3:
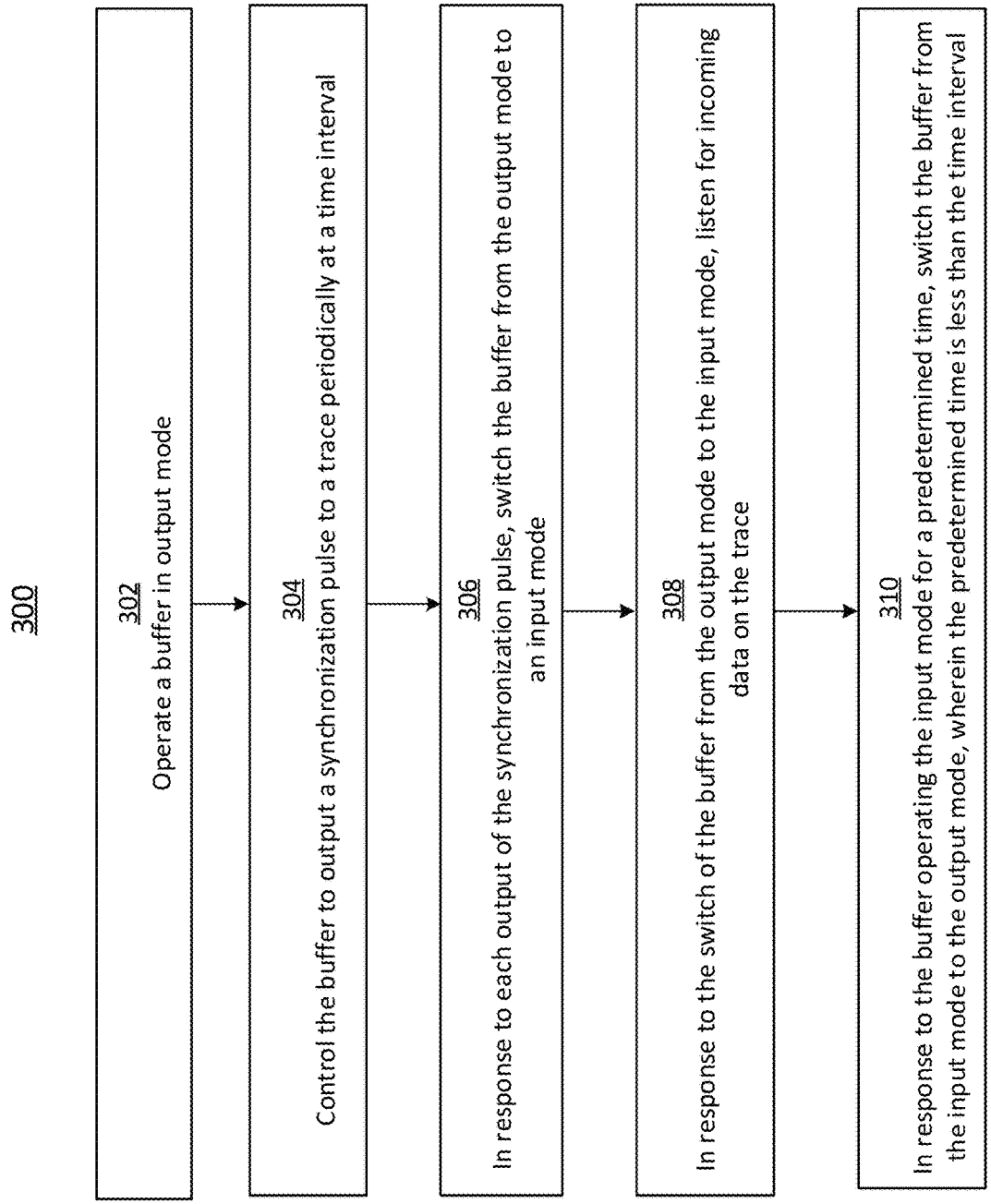
FIG. 3 a flow diagram relating to a process to implement one-line synchronous interface in one embodiment.

FIG. 3 a flow diagram relating to a process 300 to implement one-line synchronous interface in one embodiment. Process 300 may include one or more operations, actions, or functions as illustrated by one or more of blocks 302, 304, 306, 308, and/or 310. Although illustrated as discrete blocks, various blocks may be divided into additional blocks, combined into fewer blocks, eliminated, performed in different order, or performed in parallel, depending on the desired implementation.

Process 300 may be performed by a timing device (e.g., timing device 102 in FIG. 1) that distributes clock signals to a plurality of line cards (e.g., line card 106 in FIG. 1). Process 300 can begin at block 302. At block 302, the timing device can operate a buffer in output mode. The buffer can operate in the output mode to output signals to a trace, and can operate in an input mode that receives signals from the trace.

Process 300 can proceed from block 302 to block 304. At block 304, the timing device can control the buffer to output a synchronization pulse to a trace periodically at a time interval. In one embodiment, the timing device can control the buffer to output first pulses having a first pulse width, where the first pulses can represent a first binary value of data in a write operation. The timing device can output second pulses having a second pulse width, where the second pulses can represent a second binary value of data in a write operation. The pulse width of the synchronization pulse can be less than the first pulse width and the second pulse width.

Process 300 can proceed from block 304 to block 306. At block 306, in response to each output of the synchronization pulse, the timing device can switch the buffer from the output mode to an input mode. Process 300 can proceed from block 306 to block 308. At block 308, in response to the switch of the buffer from the output mode to the input mode, the timing device can listen for incoming data on the trace. Process 300 can proceed from block 308 to block 310. At block 310, in response to the buffer operating the input mode for a predetermined time, the timing device can switch the buffer from the input mode to the output mode, where the predetermined time can be less than the time interval.

In one embodiment, the timing device can receive a read request to read data. The timing device can, in response to the receipt of the read request, switch the buffer to the output mode. The timing device can control the buffer to output a read request signal representing the read request. In one embodiment, the timing device can control the buffer to output the synchronization pulse in response to outputting the read request signal. In one embodiment, the read request signal can encode a size of the requested data, and a number of times to output the synchronization pulse is based on the size of the requested data. In one embodiment, a presence of a pulse among the incoming data being listened by the timing device can represent a first binary value of the requested data. An absence of pulse among the incoming data being listened by the controller can represent a second binary value of the requested data.

Figure 4:
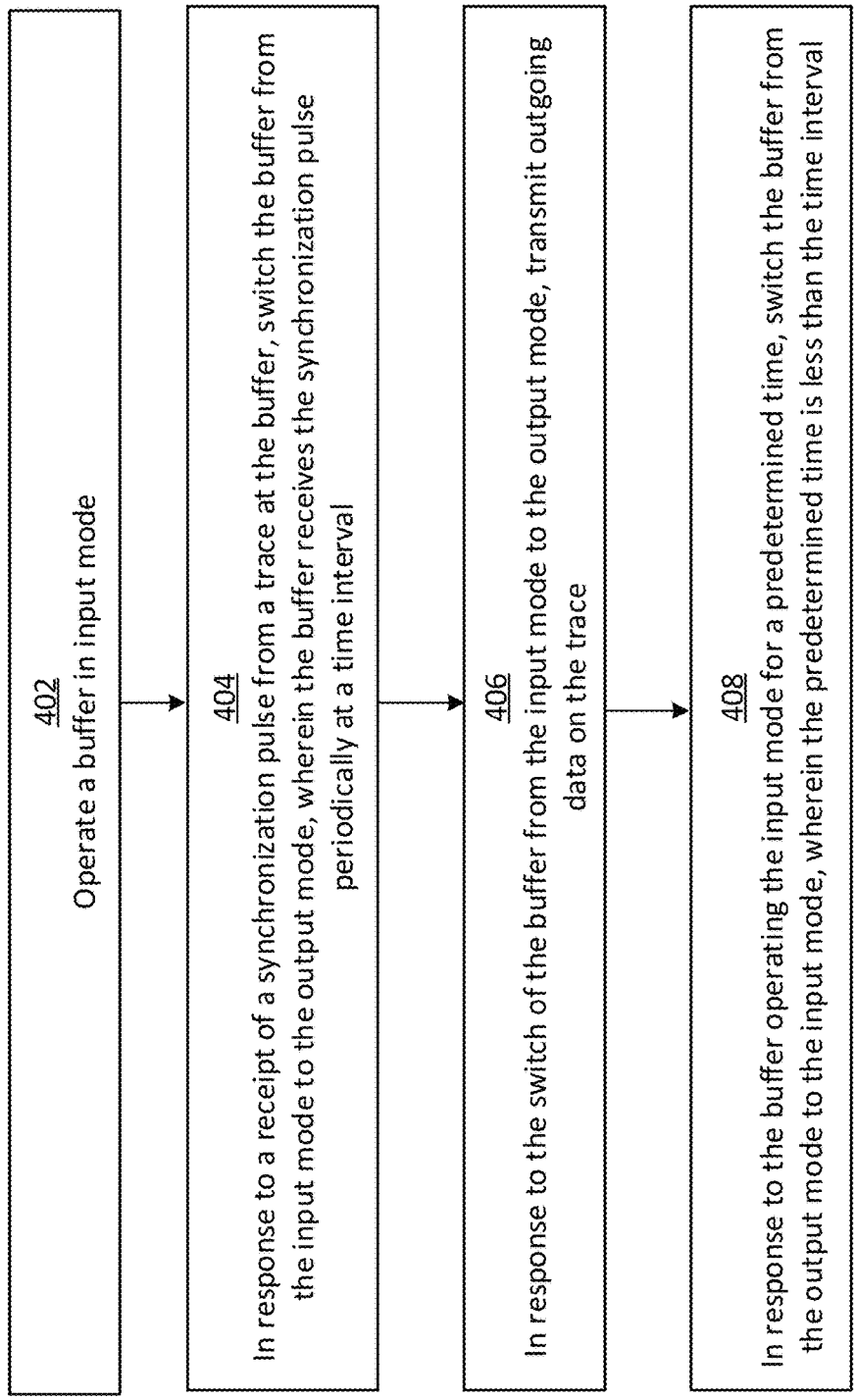
FIG. 4 a flow diagram relating to another process to implement one-line synchronous interface in one embodiment.

FIG. 4 a flow diagram relating to another process 400 to implement one-line synchronous interface in one embodiment. Process 400 may include one or more operations, actions, or functions as illustrated by one or more of blocks 402, 404, 406, and/or 408. Although illustrated as discrete blocks, various blocks may be divided into additional blocks, combined into fewer blocks, eliminated, performed in different order, or performed in parallel, depending on the desired implementation.

Process 400 may be performed by a line card (e.g., line card 106 in FIG. 1) among a plurality of line cards that receives clock signals from a timing device (e.g., timing device 102 in FIG. 1). Process 400 can begin at block 402. At block 402, the line card can operate a buffer in input mode. The buffer can operate in an output more to output signals to a trace, and can operate in an input mode to receive signals from the trace.

Process 400 can proceed from block 402 to block 404. At block 404, in response to a receipt of a synchronization pulse from a trace at the buffer, the line card can switch the buffer from the input mode to the output mode, where the buffer receives the synchronization pulse periodically at a time interval.

Process 400 can proceed from block 404 to block 406. At block 406, in response to the switch of the buffer from the input mode to the output mode, the line card can transmit outgoing data on the trace. Process 400 can proceed from block 406 to block 408. At block 408, in response to the buffer operating the input mode for a predetermined time, the line card can switch the buffer from the output mode to the input mode, where the predetermined time can be less than the time interval.

In one embodiment, the line card can detect a receipt of a read request signal at the buffer, where the read request signal encodes a request to read data. In response to the detection, the line card can switch the buffer to the output mode. The line card can control the buffer to transmit the requested data on the trace. In one embodiment, in response to the detection, the line card can latch the requested data prior to the transmission of the requested data. In one embodiment, the line card can control the buffer to transmit the requested data on the trace in response to receipt of a predetermine number of synchronization pulses. In one embodiment, the read request signal can encode a size of the requested data, and a number of synchronization pulses being received at the buffer can be based on the size of the requested data. In one embodiment, the line card can control the buffer to transmit a pulse to represent a first binary value of the requested data. The line card can prevent the transmission of the pulse to represent a second binary value of the requested data. In one embodiment, the pulse being transmitted to represent the first binary value of the requested data can be a round trip time (RTT) pulse predefined for RTT estimation.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. An apparatus comprising:
    a buffer configured to:
        operate in an output mode to output signals to a trace; and
        operate in an input mode to receive signals from the trace;
    a controller connected to the buffer, the controller being configured to:
        control the buffer to output a synchronization pulse to the trace periodically at a time interval;
        in response to each output of the synchronization pulse, switch the buffer from the output mode to the input mode;
        in response to the switch of the buffer from the output mode to the input mode, listen for incoming data on the trace; and
        in response to the buffer operating the input mode for a predetermined time, switch the buffer from the input mode to the output mode, wherein the predetermined time is less than the time interval.

2. The apparatus of claim 1, wherein the controller is configured to:
    receive a read request to read data;
    in response to the receipt of the read request, switch the buffer to the output mode; and
    control the buffer to output a read request signal representing the read request.

3. The apparatus of claim 2, wherein the controller is configured to control the buffer to output the synchronization pulse in response to outputting the read request signal.

4. The apparatus of claim 2, wherein the read request signal encodes a size of the requested data, and a number of times to output the synchronization pulse is based on the size of the requested data.

5. The apparatus of claim 2, wherein:
    a presence of a pulse among the incoming data being listened by the controller represents a first binary value of the requested data; and
    an absence of pulse among the incoming data being listened by the controller represents a second binary value of the requested data.

6. The apparatus of claim 1, wherein the controller is configured to:
    control the buffer to output first pulses having a first pulse width, wherein the first pulses represent a first binary value of data in a write operation; and
    control the buffer to output second pulses having a second pulse width, wherein the second pulses represent a second binary value of data in a write operation,
    wherein a pulse width of the synchronization pulse is less than the first pulse width and the second pulse width.

7. An apparatus comprising:
    a buffer configured to:
        operate in an output mode to output signals to a trace; and
        operate in an input mode to receive signals from the trace;

a controller connected to the buffer, the controller being configured to:
  in response to a receipt of a synchronization pulse from the trace at the buffer, switch the buffer from the input mode to the output mode, wherein the buffer receives the synchronization pulse periodically at a time interval;
  in response to the switch of the buffer from the input mode to the output mode, transmit outgoing data on the trace; and
  in response to the buffer operating the input mode for a predetermined time, switch the buffer from the output mode to the input mode, wherein the predetermined time is less than the time interval.

8. The apparatus of claim 7, wherein the controller is configured to:
  detect a receipt of a read request signal at the buffer, wherein the read request signal encodes a request to read data;
  in response to the detection, switch the buffer to the output mode; and
  control the buffer to transmit the requested data on the trace.

9. The apparatus of claim 8, wherein the controller is configured to, in response to the detection, latch the requested data prior to the transmission of the requested data.

10. The apparatus of claim 8, wherein the controller is configured to control the buffer to transmit the requested data on the trace in response to receipt of a predetermine number of synchronization pulses.

11. The apparatus of claim 8, wherein the read request signal encodes a size of the requested data, and a number of synchronization pulses being received at the buffer is based on the size of the requested data.

12. The apparatus of claim 8, wherein the controller is configured to:
  control the buffer to transmit a pulse to represent a first binary value of the requested data; and
  prevent the transmission of the pulse to represent a second binary value of the requested data.

13. The apparatus of claim 12, wherein the pulse being transmitted to represent the first binary value of the requested data is a round trip time (RTT) pulse predefined for RTT estimation.

14. A system comprising:
a timing device including a first buffer;
a line card configured to be in communication with the timing device via a trace of a backplane, the line card including a second buffer;
the timing device being configured to:
  control the first buffer to output a synchronization pulse to the trace periodically at a time interval;
  in response to each output of the synchronization pulse, switch the first buffer from a first output mode to a first input mode, wherein the first output mode allows the timing device to transmit signals to the line card, and the first input mode allows the timing device to receive signals from the line card;
  in response to the switch of the first buffer from the first output mode to the first input mode, listen for incoming data on the trace; and
  in response to the buffer operating the input mode for a predetermined time, switch the first buffer from the first input mode to the first output mode, wherein the predetermined time is less than the time interval; and
the line card being configured to:
  in response to a receipt of the synchronization pulse from the trace at the second buffer, switch the second buffer from a second input mode to a second output mode, wherein the second buffer receives the synchronization pulse periodically at the time interval, and the second output mode allows the line card to transmit signals to the timing device, and the second input mode allows the line card to receive signals from the timing device;
  in response to the switch of the second buffer from the second input mode to the second output mode, transmit outgoing data on the trace; and
  in response to the second buffer operating the output mode for the predetermined time, switch the second buffer from the second output mode to the second input mode.

15. The system of claim 14, wherein:
the timing device is configured to:
  receive a read request to read data from the line card;
  in response to the receipt of the read request, switch the first buffer to the first output mode; and
  control the buffer to output a read request signal representing the read request to the line card;
the line card is configured to:
  detect a receipt of the read request signal at the second buffer;
  in response to the detection, switch the second buffer to the second output mode; and
  control the second buffer to transmit the requested data to the timing device.

16. The system of claim 15, wherein the timing device is configured to control the first buffer to output the synchronization pulse in response to outputting the read request signal.

17. The system of claim 15, wherein the line card is configured to, in response to the detection, latch the requested data prior to the transmission of the requested data.

18. The system of claim 15, wherein the read request signal encodes a size of the requested data, and a number of synchronization pulses being transmitted from the timing device to the line card is based on the size of the requested data.

19. The system of claim 15, wherein the line card is configured to:
  control the second buffer to transmit a pulse to represent a first binary value of the requested data; and
  prevent the transmission of the pulse to represent a second binary value of the requested data.

20. The system of claim 14, wherein the timing device is configured to:
  control the first buffer to output first pulses having a first pulse width, wherein the first pulses represent a first binary value of data in a write operation; and
  control the first buffer to output second pulses having a second pulse width, wherein the second pulses represent a second binary value of data in a write operation, wherein a pulse width of the synchronization pulse is less than the first pulse width and the second pulse width.

* * * * *